United States Patent
Crapo

(10) Patent No.: US 11,100,286 B2
(45) Date of Patent: *Aug. 24, 2021

(54) METHODS AND SYSTEMS FOR IMPLIED GRAPH PATTERNS IN PROPERTY CHAINS

(71) Applicant: General Electric Company, Schenectady, NY (US)

(72) Inventor: Andrew Walter Crapo, Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/119,378

(22) Filed: Aug. 31, 2018

(65) Prior Publication Data

US 2019/0073356 A1   Mar. 7, 2019

Related U.S. Application Data

(63) Continuation-in-part of application No. 15/631,902, filed on Jun. 23, 2017.

(51) Int. Cl.
*G06F 40/30* (2020.01)
*G06N 5/02* (2006.01)
(Continued)

(52) U.S. Cl.
CPC ............ *G06F 40/30* (2020.01); *G06F 40/253* (2020.01); *G06N 5/02* (2013.01); *G06N 5/022* (2013.01); *G06F 8/20* (2013.01); *G06N 5/003* (2013.01)

(58) Field of Classification Search
CPC .......... G06F 17/30566; G06F 17/3043; G06F 17/30545; G06F 17/30418;
(Continued)

(56) References Cited

U.S. PATENT DOCUMENTS 7,987,088 B2   7/2011   Moitra et al.
9,171,060 B2   10/2015  Oberle et al.
(Continued)

FOREIGN PATENT DOCUMENTS

WO   2005052720 A2   6/2005

OTHER PUBLICATIONS

Thomas, Oliver Dr. et al., "Semantic Process Modeling—Design and Implementation of an Ontology-based Representation of Business Processes", Business & Information Systems Engineering, Dec. 2009, DOI: 10.1007/s12599-009-0078-8, (pp. 438-451, 14 total pages).

(Continued)

*Primary Examiner* — Abdelali Serrou
(74) *Attorney, Agent, or Firm* — Wood IP LLC

(57) ABSTRACT

A system and a method including accessing a semantic model having a grammar syntax supporting an expression including a combination of at least one of a semantic model class and an instance of a semantic model class; specifying at least one missing property specification for at least one of a semantic model class and an instance of a semantic model class, including constraints for a use of the at least one missing property; adding the at least one missing property specification to the semantic model, the at least one missing property specification added to the semantic model to be referenced in a validation and translation of an expression including a combination of at least one of the class and the instance of a class having one of the at least one missing property specified therewith; and generating a record of the semantic model including the at least one missing property specification added thereto.

18 Claims, 7 Drawing Sheets

(51) Int. Cl.
*G06F 40/253* (2020.01)
*G06F 8/20* (2018.01)
*G06N 5/00* (2006.01)

(58) Field of Classification Search
CPC ......... G06F 17/30421; G06F 17/30513; G06F 17/241; G06F 17/271; G06F 17/274; G06F 17/2785; G06F 40/30; G06F 40/253; G06F 8/20; G06F 40/211; G06F 40/284; G06F 16/36; G06F 16/90332; G06F 40/35; G06F 30/00; G06F 30/20; G06F 16/283; G06F 40/169; G06F 40/226; G06F 16/2428; G06F 16/248; G06F 40/216; G06F 16/24539; G06F 16/334; G06F 16/8358; G06F 17/2725; G06F 17/30398; G06F 17/30554; G06F 17/30592; G06F 40/174; G06F 40/295; G06N 5/022; G06N 5/02; G06N 5/003
See application file for complete search history.

(56) References Cited

U.S. PATENT DOCUMENTS

| | | | | |
|---|---|---|---|---|
| 9,471,562 | B2* | 10/2016 | Anisimovich | G06F 40/284 |
| 9,747,079 | B2 | 8/2017 | Siu et al. | |
| 9,798,976 | B2 | 10/2017 | De et al. | |
| 10,089,389 | B1* | 10/2018 | Van Rotterdam | G06F 16/3329 |
| 10,346,540 | B2* | 7/2019 | Karov | G06F 16/90332 |
| 10,585,932 | B1* | 3/2020 | Ohsie | G06F 11/3409 |
| 2006/0036592 | A1* | 2/2006 | Das | G06F 16/2448 |
| 2008/0021700 | A1* | 1/2008 | Moitra | G06F 16/367 |
| | | | | 704/9 |
| 2008/0091405 | A1* | 4/2008 | Anisimovich | G06F 40/284 |
| | | | | 704/4 |
| 2011/0093469 | A1* | 4/2011 | B'Far | G06F 16/254 |
| | | | | 707/741 |
| 2012/0109640 | A1* | 5/2012 | Anisimovich | G06F 40/268 |
| | | | | 704/9 |
| 2012/0278788 | A1 | 11/2012 | Crapo | |
| 2013/0041652 | A1* | 2/2013 | Zuev | G06F 40/268 |
| | | | | 704/8 |
| 2013/0144828 | A1* | 6/2013 | Lawley | G06F 40/211 |
| | | | | 706/46 |
| 2013/0275448 | A1* | 10/2013 | Mirhaji | G06F 16/3344 |
| | | | | 707/756 |
| 2013/0311487 | A1* | 11/2013 | Moore | G06F 16/93 |
| | | | | 707/749 |
| 2014/0324908 | A1* | 10/2014 | Graham | G06F 16/215 |
| | | | | 707/776 |
| 2015/0161180 | A1* | 6/2015 | Hermanns | G06F 16/212 |
| | | | | 707/810 |
| 2016/0019192 | A1* | 1/2016 | Crapo | G06F 40/30 |
| | | | | 715/234 |
| 2016/0110478 | A1* | 4/2016 | Aggour | G06F 17/40 |
| | | | | 707/755 |
| 2016/0179787 | A1* | 6/2016 | Deleeuw | G06F 40/30 |
| | | | | 704/9 |
| 2016/0179945 | A1* | 6/2016 | Lastra Diaz | G06F 16/3334 |
| | | | | 707/739 |
| 2016/0224541 | A1* | 8/2016 | Yakovlev | G06F 40/30 |
| 2016/0224542 | A1* | 8/2016 | Bulgakov | G06F 40/30 |
| 2016/0364377 | A1* | 12/2016 | Krishnamurthy | G06F 40/30 |
| 2017/0060972 | A1 | 3/2017 | McHugh et al. | |
| 2018/0300311 | A1* | 10/2018 | Krishnamurthy | G06F 40/56 |

OTHER PUBLICATIONS

European Search Report dated Jan. 3, 2020 which was issued in connection with EP19187369.4 which was filed on Jul. 19, 2019.
Anonymous: "Implied Properties" Jun. 29, 2017. Retrieved from the Internet on Dec. 10, 2018: URL: http://sad1.sourceforge.net/sad13/ImpliedPorperties.html.
Anonymous: SADL Constructs Useful in Building Models: May 15, 2018. Retrieved from the Internet on Dec. 12, 2019: URL: http://sad1.sourceforge.net/sad13/Sad1Constructs.html.
A. W. Crapo: "SADL Architecture" Oct. 23, 2014. Retrieved from the Internet on Dec. 10, 2018: URL: http://sad1.sourceforge.net/Architecture.html.
A. W. Crapo: "Semantic Modeling" Dec. 11, 2010. Retrieved from the Internet on Dec. 10, 2018: URL: http://sad1.sourceforge.net/tutorial/foundational concepts.html.
Anonymous: "Quick Introduction to SADL 3" Jun. 29, 2017. Retrieved from the Internet on Dec. 13, 2019: http://sad1sourceforge.net/sad13/sad13.html.
Anonymous: "GitHub" Jun. 11, 2018. Retrieved from the Internet on Dec. 13, 2019: URL: http://web.archive.org/web/20180611004219/https://github.com/crapo/sad1os2/.

* cited by examiner

700

```
┌─────────────────────────────────────────────────────────┐
│  ACCESS A SEMANTIC MODEL HAVING A GRAMMAR SYNTAX        │
│  SUPPORTING AN EXPRESSION INCLUDING A COMBINATION OF    │
│  AT LEAST ONE OF A SEMANTIC MODEL CLASS AND AN          │
│  INSTANCE OF A SEMANTIC MODEL CLASS                     │
│                                                     705 │
└─────────────────────────────────────────────────────────┘
                            │
                            ▼
┌─────────────────────────────────────────────────────────┐
│  SPECIFY AT LEAST ONE MISSING PROPERTY SPECIFICATION FOR│
│  AT LEAST ONE OF A SEMANTIC MODEL CLASS AND AN INSTANCE │
│  OF A SEMANTIC MODEL CLASS FOR THE SEMANTIC MODEL, THE AT│
│  LEAST ONE MISSING PROPERTY SPECIFICATION SPECIFYING    │
│  CONSTRAINTS FOR A USE OF AT LEAST ONE MISSING PROPERTY WITH│
│  THE AT LEAST ONE OF A SEMANTIC MODEL CLASS AND         │
│  AN INSTANCE OF A SEMANTIC MODEL CLASS                  │
│                                                     710 │
└─────────────────────────────────────────────────────────┘
                            │
                            ▼
┌─────────────────────────────────────────────────────────┐
│  ADD THE AT LEAST ONE MISSING PROPERTY SPECIFICATION TO │
│  THE SEMANTIC MODEL, THE AT LEAST ONE MISSING PROPERTY  │
│  ADDED TO THE SEMANTIC MODEL TO BE REFERENCED IN A      │
│  VALIDATION AND TRANSLATION OF AN EXPRESSION INCLUDING  │
│  A COMBINATION OF AT LEAST ONE OF THE CLASS AND THE     │
│  INSTANCE OF A CLASS HAVING ONE OF THE AT LEAST ONE     │
│  MISSING PROPERTY SPECIFIED THEREWITH                   │
│                                                     715 │
└─────────────────────────────────────────────────────────┘
                            │
                            ▼
┌─────────────────────────────────────────────────────────┐
│  GENERATE A RECORD OF THE SEMANTIC MODEL                │
│  INCLUDING THE AT LEAST ONE MISSING PROPERTY            │
│  SPECIFICATION ADDED THERETO                            │
│                                                     720 │
└─────────────────────────────────────────────────────────┘
```

*FIG. 7*

METHODS AND SYSTEMS FOR IMPLIED GRAPH PATTERNS IN PROPERTY CHAINS

CROSS REFERENCE TO RELATED APPLICATIONS

This application is a continuation-in-part of U.S. patent application Ser. No. 15/631,902, filed Jun. 23, 2017, now U.S. Pat. No. 10,984,195, the entire content of which is incorporated herein by reference in its entirety.

BACKGROUND

The field of the present disclosure relates generally to semantic models, more particularly, to systems, devices and methods of enhancing a semantic modeling language to accommodate more natural expressions.

Semantic models formally capture knowledge regarding a domain (e.g., the English language) through defining classes, properties, instances, axioms, and rules. However, in natural language usage it is often the case that some properties of English might be omitted from sentences and/or statements. That is, natural usage of the language might be less formal and explicit than a semantic model representing the language. Requiring complete specification of properties and property chains, as specified in a semantic model, might make natural language seem constrained, rigid, and/or overly formal.

In some respects, a need exists for methods and systems that improve and enhance a semantic modeling language such that the modeling language can be used to efficiently generate natural expressions.

BRIEF DESCRIPTION

In one aspect, an embodiment of the present disclosure relates to accessing a semantic model, the semantic model having a grammar syntax supporting a comparison of at least one of a semantic model class and an instance of a semantic model class to an incompatible value; specifying an implied property for one of a semantic model class and an instance of a semantic model class in the semantic model, the implied property having an associated range; adding the implied property to the semantic model, the implied property to be referenced in a validation and translation of an expression including one of the class and the instance of a class having the implied property specified therewith compared to an incompatible value; and generating a record of the semantic model including the implied property added thereto.

In other embodiments, a system may implement, execute, or embody at least some of the features of the processes herein. In yet another example embodiment, a tangible medium may embody executable instructions that can be executed by a processor-enabled device or system to implement at least some aspects of the processes of the present disclosure.

DRAWINGS

These and other features, aspects, and advantages of the present disclosure will become better understood when the following detailed description is read with reference to the accompanying drawings in which like characters represent like parts throughout the drawings, wherein:

FIG. 7 is another illustrative example graph model view of the semantic model of FIG. 3 including instance data for the domain, according to some embodiments herein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

Figure 1:
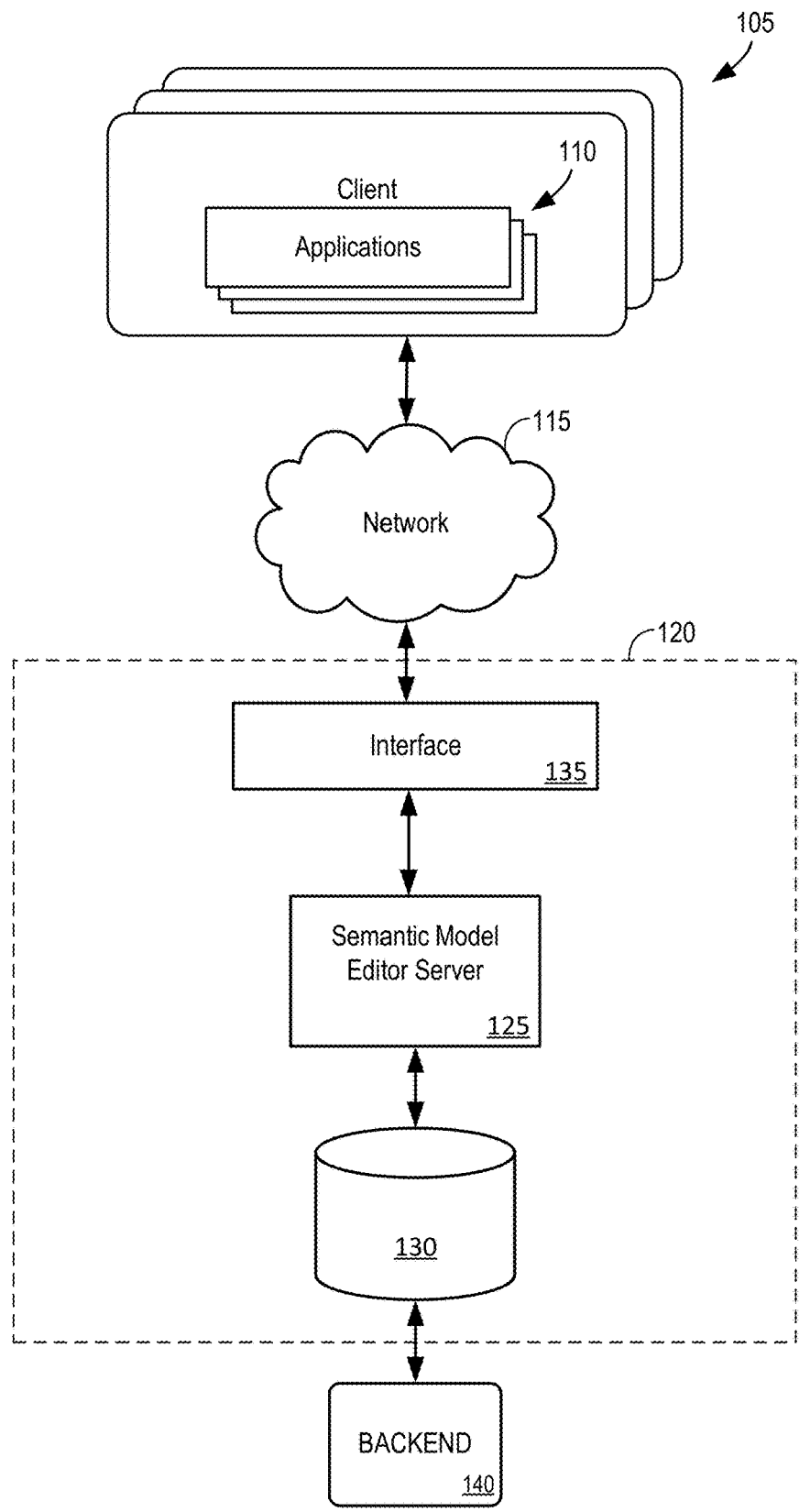
FIG. 1 is an example block diagram of a system.

FIG. 1 is an illustrative block diagram of an architecture or system 100, in one example. Examples of some embodiments of the present disclosure are not limited to the particular architecture 100 shown in FIG. 1. System 100 includes one or more client devices 105 running one or more applications 110. Applications 110 may include different software applications that support the operations and process of an organization. In some embodiments, one of the applications 110 may include, at least in part, functionality or a tool to assist a user in building a controlled-English semantic modeling language that includes features that facilitate natural expressions and using the modeling language readable by both human users and machine entities. As used herein, such features can include "implied properties". Herein, as will be explained in greater detail below, implied properties can relate to a semantic model class or an instance of a semantic model class and further define the class or instance of class to which they are associated. In some aspects, implied properties are specified as being associated with a class or an instance of a class in the semantic model. Yet, implied properties need not be specifically stated or otherwise explicitly included in a natural language expression otherwise conforming with the semantic model.

In some aspects, a controlled-language modeling language herein might be related to English. Moreover, the controlled-English is controlled in the sense that no ambiguities exist in using the controlled-English, valid statements must match a defined syntax, and match a certain semantics. However, the present disclosure is not limited to providing features and mechanisms for English-based modeling languages. In some embodiments, applications 110 may be configured to facilitate, support, and execute a program (e.g., a modeler) to generate and add implied properties to a semantic modeling language ontology and the use of such modeling language to, for example, accurately translate and evaluate natural language expressions into a semantic modeling language representation.

The cloud platform 120 may include an interface gateway 135 to facilitate, enable, and support communication between clients 105 and a semantic model editor server 125. The devices at 105 may execute a browser that is used by a user to interface with cloud platform 120 via network 115.

Semantic model editor server 125 may be associated with storage device 130 such as, but not limited to, a storage area network. In some embodiments, cloud platform 120 may include more than one instance of a server such as semantic model editor server 125 and more than one data storage device 130. Storage device 130 may comprise any query-responsive data source or sources that are or become known, including but not limited to a relational database management system. Data stored in the storage device 130 may be stored as part of a relational database, a multi-dimensional database, an Extensible Markup Language (XML) document, or any other data storage system storing structured and/or unstructured data. The data may be distributed among several relational databases, multi-dimensional databases, and/or other data sources. In some embodiments, storage device 130 may be implemented as an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Embodiments are not limited to any number or types of data sources. Translation server 125 may comprise a computing device that processes requests using a computer processor.

System 100 may further include a backend system that can generate, automatically, in response to a request or call from cloud platform 120, executable code or instructions to perform a process to build a semantic modeling language ontology and and/or semantic models. In some aspects herein, a user may provide an indication or request to build or add features to a semantic modeling language, as implemented in an application 110 and/or cloud platform 120 via network 115, which may operate in cooperation with the processing of a backend system 120 to generate a response to effectuate the addition of features to the semantic modelling language.

In one example, a client 105 executes an application 110 to build or add features to a semantic modeling language ontology via a user interface (UI) to a user on a display of client 105. The user may manipulate UI elements within the UI, via touchscreen, keyboard, or audio entries, to indicate and specify an implied property to associate with a class or an instance of a class of a semantic modeling language, where the cloud platform 120, in cooperation with server database 130 and possibly backend system 140, generate and add, for example, an implied property to the semantic modeling language.

In some contexts, the use of natural language may be characterized, at least in part, by the use of the name of a class to represent an instance of the class of a semantic model formal representation of the natural language. In some instances, a preceding article in a natural language statement or expression indicates whether a specific instance or any instance of the named class is being referenced. As an example, consider the sentence, "George is playing under the tree." In this example, the phrase "the tree" indicates a particular instance of the "tree" class is being referenced in the statement. The intended instance is presumably clear from context. In contrast, consider the sentence "Plan for the future—plant a tree." In this example, the term "tree" is understood to refer to some unidentified member of the "tree" class.

As an extension of this kind of construct regarding the use of a name of a class to represent an instance of the class of a semantic model's formal representation of natural language, class names may be used as proxies for a particular value of an instance of the class. This might be the case when the existence of a class in the formal semantic model is required in order to give additional information about a data value. For example, in OWL a data value does not have identity and as such it cannot be the subject of a triple (statement). Accordingly, an instance of a class is created to allow the additional information to be associated with the data value. By way of an example, measurements might have an associated numeric value as well as an associated unit.

As an example, following below is a portion of a simple ontology capturing a conceptualization of "Measurement". The ontology is expressed in the Semantic Application Design Language (SADL), a controlled-English representation whose grammars and dictionaries have been restricted in order to reduce or eliminate ambiguity and complexity and seeks to make semantic models more easily understood and authored by subject matter experts.

MeasurementSystem is a class, must be one of {SystemInternationale (alias "SI"), ImperialUnits, US_CustomaryUnits}.

Unit is a class, described by system with values of type MeasurementSystem.

Measurement is a class described by ^value with a single value of type double,
   described by unit with a single value of type Unit,
   described by timeStamp with a single value of type dateTime.

LengthUnit is a type of Unit, must be one of {Foot (alias "ft", "feet"), Meter (alias "m"), Centimeter (alias "cm"), Millimeter (alias "mm")}.

Using the above semantic model and given the task of measuring a football field, one might say (using natural language), "The measurement is 300". Someone might respond to this statement by saying, "Oh, then the measurement is in feet." However, to be fully consistent with the semantic model, the original statement should have been more explicit and configured as a first statement of, "The value of the instance of measurement is 300" and a second statement of "The unit of the instance of measurement is foot".

One issue or problem with the more explicit statements that are fully compliant with the semantic model is that while they are clear in their meaning due to the specificity therein, the two statements are more verbose than the original, natural language statement. In some aspects herein, the present disclosure provides a technical solution to this type of problem (for example) by disclosing implied properties that can be added to a semantic model and further used to allow a semantic model builder (or other entity) to generate an expression and statement using a class name or an instance of a class name rather than having to express statements in a complete and explicit model-consistent manner. In some aspects, the implied properties disclosed herein may provide and/or facilitate a modeling language that may be used to represent expressions more naturally, which is an objective of SADL and some other modeling languages. In some aspects, users of semantic modeling languages have demonstrated a desire for mechanisms to represent expressions in a natural language-like manner.

In some aspects, SADL grammar supports a syntax of comparing a class or instance of a class to a value, including a scenario where the value is a number or a string. However, type checking by a validation function will identify such a comparison where the two sides of the comparison are not the same type as an error. Moreover, even if the validation did not flag the comparison, then a translator function will generate output that cannot be processed or is unexpected. As such, in some embodiments both avalidator and a translator should be informed or otherwise made aware of any special handling of the class or the instance of a class comparison with the value, as effectuated by implied properties herein.

In some embodiments, a validator, a translator, and other devices/entities/functionalities might be informed of an implied property associated with a class or the instance of a class being compared (in one example) with a value by associating or designating "implied properties" on a class. An indication of an implied property on a class might be implemented, in some embodiments, as a data field, a value, a "flag", a hash value, or other mechanism/indicator in a data structure representation of the class. In some embodiments, an implied property associated with a class might be configured as an annotation property. An annotation property may be used for at least two reasons. First, OWL DL (a maximally expressive flavor of OWL) does not allow statements with user-defined OWL object properties to have classes as subjects or properties as values. Secondly, it is desired that semantic statement reasoners do not try to use the statements made about implied properties since they are only to be used by validator and translator processes. Since annotation properties are normal/ignored by reasoners, configuring implied properties disclosed herein as an annotation property provides a technical solution to the problems being addressed.

In some embodiments, an implied property can be added to a semantic model. Continuing with the semantic model example introduced above, implied properties can be added as indicated below.

impliedProperty is a type of annotation.
Measurement has impliedProperty ^value.
Measurement has impliedProperty unit.

In the additional specification of implied properties for the "Measurement" class as indicated in the listing above, it is noted that the definition of "impliedProperty" is shown here. However, such a definition would not typically be listed as part of a user model (although it might be part of the SADL pre-defined, implicitly included concepts in, for example, SadlImplicitModel.sadl.)

In some embodiments and use-cases, when a validator or translator encounters an apparent type conflict (e.g., comparing an instance of "Measurement" to an incompatible value such as a number from the example introduced above), it can determine whether implied properties are associated with the class specified or the class to which a specified instance belongs. In the event that there is an implied property whose range is compatible with the value in the comparison, then the validator or translator will insert the implied property value in the comparison to create a "property of" construct (e.g., "value of Measurement", "unit of Measurement".

In some embodiments when implied properties are used on one side of a relationship to extend the property chain to match the type of the value on the other side, a class cannot have more than one implied property with a given range or else ambiguity results. In some instances, specifying two implied properties having ranges that are close to each other (e.g., decimal and float) may be unreliable in practice as the values for the implied properties should be carefully specified to ensure that the specified values are matched with the proper desired property since the values close in ranges might be compatible with the other property.

Figure 2:
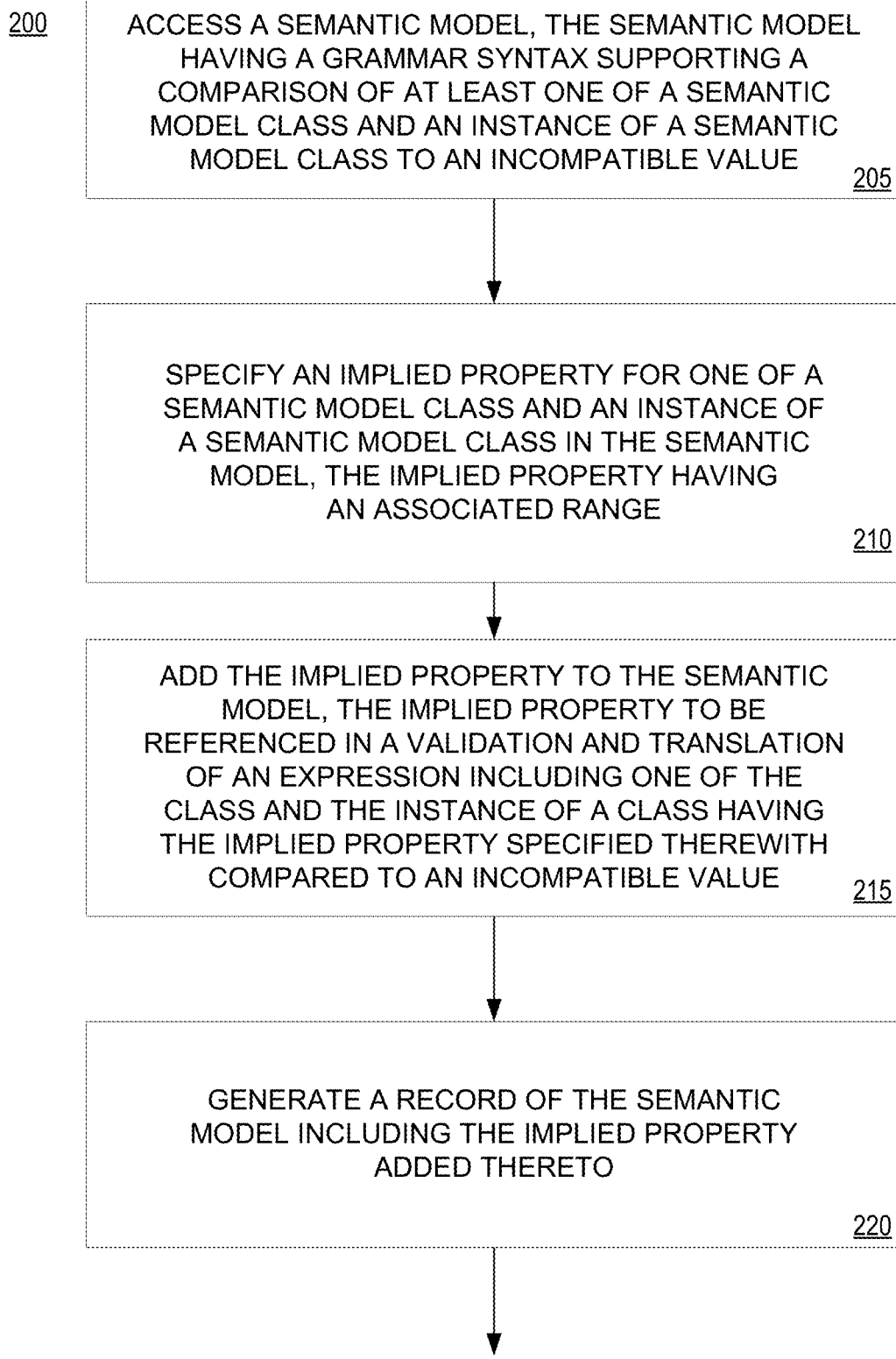
FIG. 2 is an illustrative example of a process, according to some aspects herein.

FIG. 2 is an illustrative depiction of a framework or process 200 for adding an implied property feature to a semantic modeling language ontology. In the present disclosure, the implied property might be used to translate and/or evaluate natural language expressions in the context of a controlled-English semantic model. In some embodiments, Semantic Application Design Language (SADL) Requirements Language (SRL) statement(s) might be generated to represent the natural language requirement. SADL is a controlled-English language and development environment that can be used to generate a W3C (World Wide Web Consortium) recommended OWL (Web Ontology Language) ontology. However, the ontology could be generated by other means and need not be limited to OWL, which is just one of multiple languages that could be used for the ontology. Likewise, while some of the embodiments and examples herein may be discussed in the context of using SRL, other languages with defined grammars and semantics could also be used and are within the scope of the present disclosure. In some aspects, a system ontology (e.g., SADL) is provided to, obtained by, or otherwise accessible or known by a system or device executing process 200 prior to or during the execution of process 200.

At operation 205, a semantic model is accessed. The semantic model of operation 205 may include a grammar syntax that supports a comparison of at least one of a semantic model class or an instance of a semantic model class to an incompatible value. While the syntax will support the configuration of such a comparison, a validator function and/or a translator function of a semantic model processing method or system might yield an error as discussed above. In some embodiments, the incompatible value may be a number or a string value.

In accordance with some aspects herein and in an effort to facilitate and support natural language-like expressions, an implied property is specified at operation 210 of process 200. The implied property is specified or otherwise defined as being associated with a specific class or the instance of a class within the domain of the semantic model accessed in operation 205.

Proceeding to operation 215, the implied property specified (i.e., defined) at operation 210 is added to the semantic model. The implied property may be added to the semantic model via a semantic model editor (e.g., FIG. 1, system 100) or other systems, devices, and processes. Regarding the implied property added to the semantic model, the implied property added may be referenced in a validation and translation of an expression including one of the class or the instance of a class specified as being associated with the implied property at operation 210 for the purpose of (at least) being compared to an incompatible value in the expression.

In some embodiments, the fact that a class or an instance of a class is specified as being associated with an implied property does not necessarily (automatically) invoke a referencing to the implied property associated with the class or the instance of a class. Moreover, the consideration of an implied property need not be undertaken unless there is an indication of some sort that a class or an instance of a class actually has an associated implied property. Based on these factors, a processing of semantic modeling language represented statements might be efficiently and accurately processed.

At operation 220, a record of the semantic model, as modified to include the implied property as added at operation 215, is generated. The record may be implemented in any data structure now known or that becomes known in the future. The record of the semantic model including the implied property may be stored in a database and managed thereby for fast and efficient storing, retrieving, and version tracking.

In some embodiments, a semantic model improved or enhanced by the addition of an implied property as disclosed herein may be further used in other processes. In particular, such a semantic model may be used to express statements in a manner that more closely tracks natural language due, at least in part, to the implied properties included in the semantic model. This aspect of the present disclosure is indicated in FIG. 2 by the arrow pointing away from operation 220.

Figure 3:
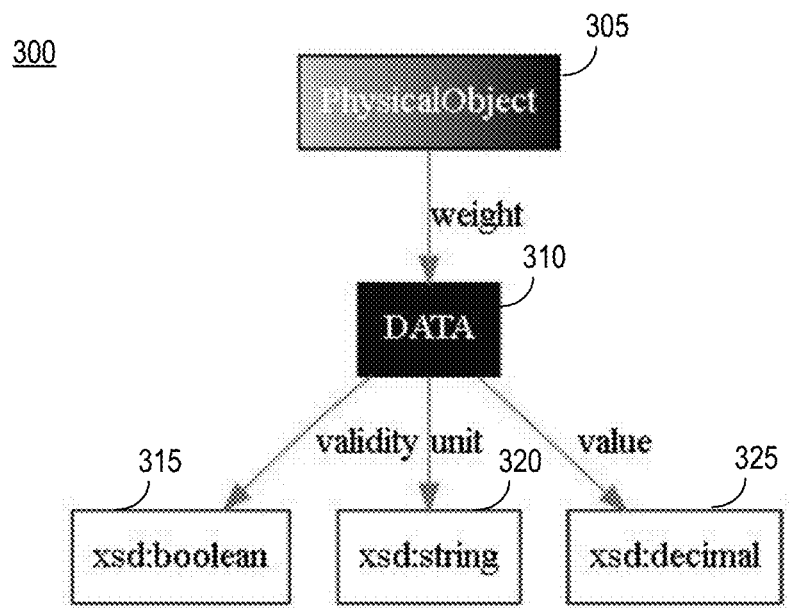
FIG. 3 is an illustrative depiction of one example of an illustrative graph model view of a semantic model, according to some aspects herein.

FIG. 3 is an illustrative graphic model view 300 of a semantic model, in accordance with some embodiments. The graphic model representation 300 is presented in an effort to further demonstrate some aspects of the implied properties disclosed herein. Referring to FIG. 300, the domain model therein is defined in terms of classes, properties, and property domain and range classes. For the example of FIG. 3, the following definitions apply (shown in SADL syntax):

DATA is a class,
described by value with a single value of type decimal,
described by validity with a single value of type boolean,
described by unit with a single value of type string.
PhysicalObject is a class,
described by weight with values of type DATA.

Accordingly, referring to graphical representation shown in FIG. 3, semantic model 300 includes the property weight having domain PhysicalObject (305) and range DATA (310). The properties validity, unit, and value each have domain-DATA (310) and ranges xsd:Boolean (315), xsd:string (320), and xsd:decimal (325), respectively.

Figure 4:
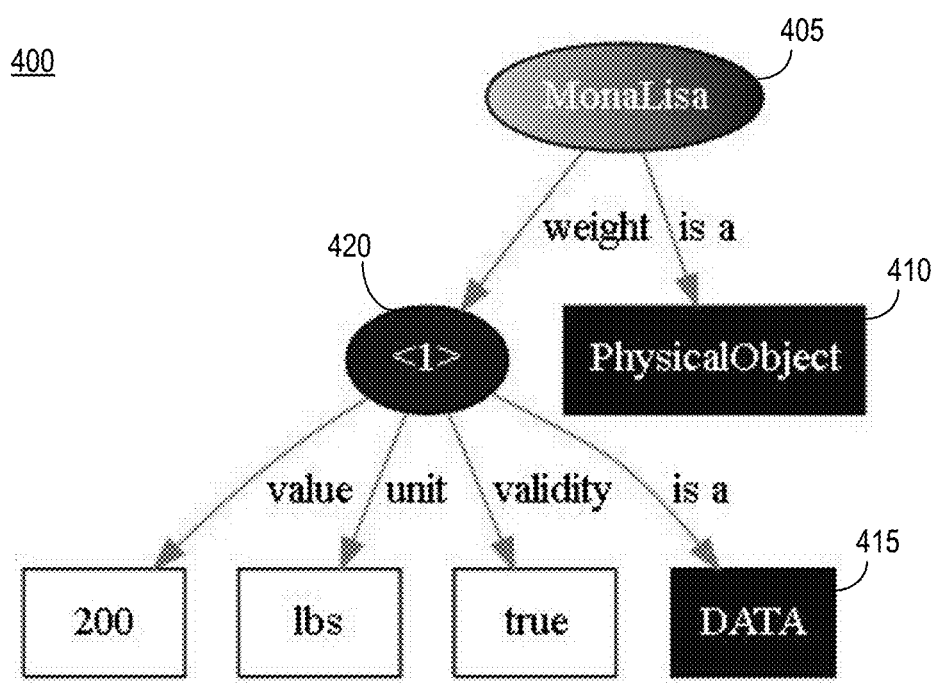
FIG. 4 is an illustrative example graph model view of the semantic model of FIG. 3 including instance data for the domain, according to some embodiments herein.

To further illustrate some aspects herein, FIG. 4 is an illustrative depiction of the semantic model 400 based on the model of FIG. 3 with some exemplary instance data for the domain. Namely, MonaLisa 405 is a PhysicalObject 410 with weight (a DATA 415 with ˆvalue 200, with unit "lbs", with validity true).

Referring to FIG. 4, the "<1>" in graph 400 signifies a blank node 420, given the identifier "<1>" to distinguish it from other blank nodes in the graph (no additional blank nodes shown in FIG. 4). In an example to query a triple store with respect to FIG. 4, one might ask, weight of MonaLisa (in SPARQL, namespaces omitted, "select ?w where {<MonaLisa><weight>?w}")

This query will return the blank node designated "<1>" (420) in the graph. Using Jena (or other semantic model processing application or framework), the result is "w=-1f420ac5:15b49f44305:-5089(blank node)". However, this result is suited to sophisticated users, not typically understood by a naive user.

In an effort to generate statements and expressions in a more natural language-like format, implied properties in accordance with the present disclosure can be used to enhance the semantic model of FIG. 4. In particular, the following is added to the domain model.

DATA has impliedProperty value.
DATA has impliedProperty unit.
DATA has impliedProperty validity.

Having added the implied properties above to the semantic model 400, a reply to the query of weight of MonaLisa will now return an answer of "w→value=200, w→unit= "lbs", w→validity=true".

In some aspects and use-cases, natural language statements and expressions might not be limited to a single triple statement (subject, predicate, object) per sentence. In some use-cases, a natural language sentence may include one or more chains of relationships. For example, consider the following snippet of OWL data (where the "validity" property is dropped for purposes of simplicity and clarity of the example).

Margie is a Person with weight (a DATA with value 135, with unit "lbs").
John is a Person with weight (a DATA with value 180, with unit "lbs").
John has child (a Person with friend (a Person with spouse Margie)).

Figure 5:
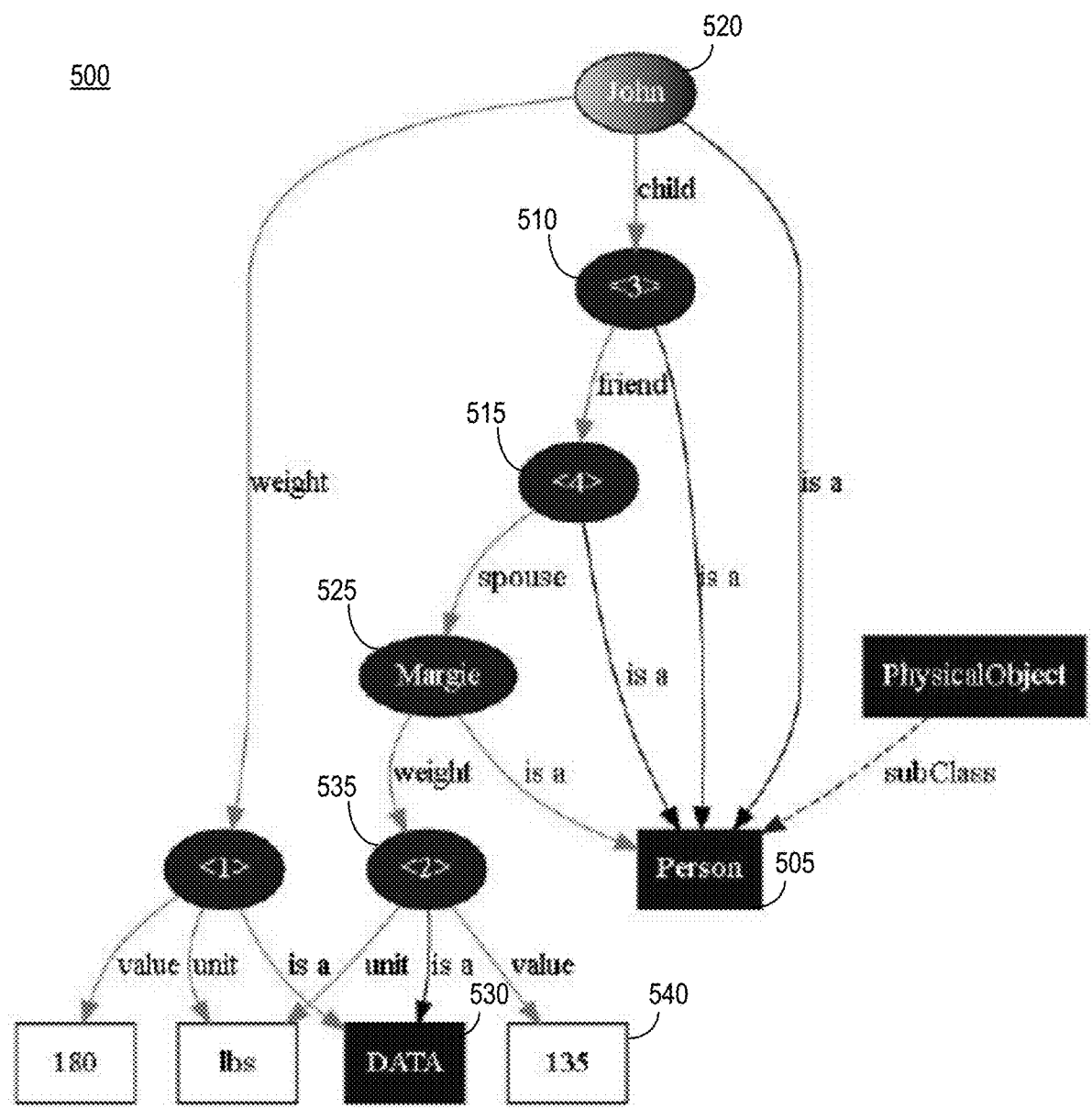
FIG. 5 is an illustrative depiction of a graph model view including property chains and implied properties, according to some embodiments herein.

This immediately foregoing data is visually depicted in the graph model 500 of FIG. 5. The graphical model 500 includes two unnamed instance nodes of type Person 505 (i.e., "<3>" at 510 and "<4>" at 515 in the property chain connecting John 520 and Margie 525.

Based on graph model 500, consider these two statements.
(1) Ask: select p where p has child with friend with spouse Margie
(2) Ask: select q where q is the spouse of a friend of a child of John.

The first query looks for a pattern with a "forward" property chain from an unbound variable "p" to the instance node "Margie". The second query however looks for a pattern with a "backward" property chain from an unbound variable "q" to the instance node "John". Given the example data set of FIG. 5, the first query will return a single possible binding for "p=John" and the second query will return the single possible binding for "q=Margie".

Now, still referring to FIG. 5, we consider the case where the second query above is modified slightly to:

Ask: select w where w is the weight of the spouse of a friend of a child of John and w<150.

In light of the modification, since the range of "weight" is "DATA" 530, and "DATA" cannot be compared ("<") to the number 150, an implied property may be considered to make sense of the query. As such, one implied property is found in "value". Therefore, the translated query is:

Ask: select wv where wv is the ˆvalue of the weight of the spouse of a friend of a child of John and wv<150.
Represented in SPARQL, the quay is:

--- select ?wv where {<John> <child> ?x . ?x <friend> ?y . ?y <spouse> ?z . ?z <weight> ?w . ?w <value> ?wv. filter(?wv < 150)}

--- where variable "x" corresponds to node "<3>" (510) in the graph, "y" corresponds to node "<4>"(515), "z" will be bound to "Margie"(525), "w" corresponds with node "<2>" (535), and "% w" will be bound to "135"(540).

In some aspects and embodiments, an applicability of implied properties may extend beyond operations with a property chain on one side and a value on the other, as the querying example above. For example, in a rule premise one might wish to compare two objects, such as "weight of X=weight of V". (Other rule premise conditions would bind variables X and Y, e.g., a binding might be "weight of MonaLisa=weight of JohnDoe".) This comparison could return true only if all three of these statements were true.

value of weight of MonaLisa=value of weight of JohnDoe
unit of weight of MonaLisa=unit of weight of JohnDoe
validity of weight of MonaLisa=validity of weight of JohnDoe In some embodiments where the relationship is a comparison or an assignment, per the immediate example above, there can be multiple implied properties with a given range since the property chain is extended on each side of the relationship with the implied properties. For example, there could be implied properties on DATA of "value" with range decimal and "normalizedValue" with range decimal. Then, the result is the expansion of the comparison or assignment to include both:

value of weight of MonaLisa=value of weight of JohnDoe
nominalValue of weight of MonaLisa=nominalValue of weight of JohnDoe For comparison/assignments with implied properties to be applied on both sides of the relationship, a different annotation property could be used, the differentiation allowing multiple implied properties with the same range in this latter instance. For example, one might use as annotation property "expandedProperty".

In some aspects, the implied properties and expanded properties disclosed hereinabove might be specific embodiments of a broader topic. In some instances, the implied properties and expanded properties herein might be applied in a specific set of problems and contexts, whereas the further, broader topic of the present disclosure may, in general, be applicable to a broader set of problems, use-cases, and contexts.

In some aspects, properties may be chained together to form a property chain. An example template of a property chain might include, for example, Property_1 of Property_2 of Property_3 . . . of Property_n. In some instances regarding an implied property herein, a first (or last) property in a property chain might be determined or inferred based on an implied property included in an semantic model. For example, the comparison statement, "Joe is less than 23" might be unambiguously interpreted to mean "The age of Joe is less than 23" based on an implied property associated with the person "Joe". An implied property may be useful in determining a meaning for a property on one side of a comparison statement (e.g., less than, more than, equal to, etc.). In some instances regarding an expanded property herein, expanded properties might be applied to both sides of a comparison statement. For example, the statement, "Joe is less than Sally" might be unambiguously interpreted as "The age of Joe is less than the age of Sally". In some embodiments, an expanded property herein might be applied to both sides of a comparison comparing the properties of two subjects or an assignment (e.g., a conclusion of a rule, etc.).

Regarding a broader topic of property chains comprising multiple triples, it may be desirable to a represent a portion of a property chain without explicitly stating each and every property in the property chain in an effort to, in some instances, more closely replicate natural language as exchanged between entities having a deep understanding of a common domain (e.g., knowledge base, subject matter, etc.). In some aspects herein, the present disclosure relates to a method and system for technically achieving, for example, a more efficient and concise process and system of unambiguously interpreting (e.g., translating) property chains including missing properties.

In some embodiments, a statement including a property chain having at least one property missing thereform may be accurately interpreted and understood by a machine, system, or service if the ontology for the property chain is unambiguous. For example, in the instance there is only one range of one (e.g., first) property that is the domain of another (e.g., second) property in a particular ontology, then the first property may be unambiguously determined to be the missing property from a property chain including the second property. That is, if there is only one possible way to string together properties based on an ontology to determine a property of a missing subject in a property chain, the determined property is completely unambiguous. Given this criteria for unambiguously determining a missing property in a property chain, some embodiments herein relate to methods and systems to support the representation of statements including property chains with at least one missing property in the chain and the unambiguous interpretation thereof.

In one embodiment, missing triple patterns are supported by the present disclosure wherein a portion of a statement including a property chain may omit a property in the chain and still be unambiguously (i.e., only one solution) interpreted from the partial property chain. In some instances, the missing property might be omitted from the beginning or the end of the property chain. The problem of missing triple patterns herein is not necessarily limited to instances where there is only one possible property (as discussed in the context of some implied properties herein). Some embodiments herein encompass instances where one or more properties might be a possibility for the missing property.

Figure 6:
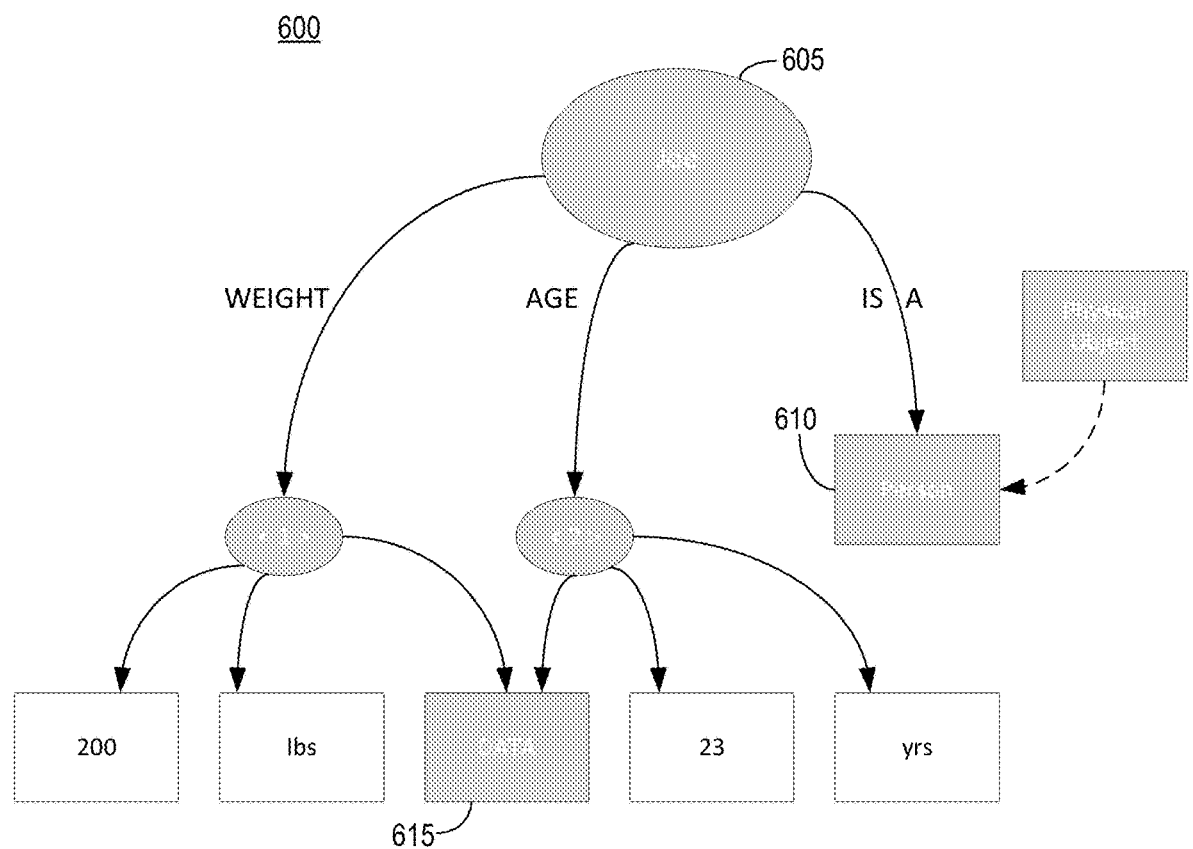
FIG. 6 is an illustrative example of a process, according to some aspects herein.
Figure 8:
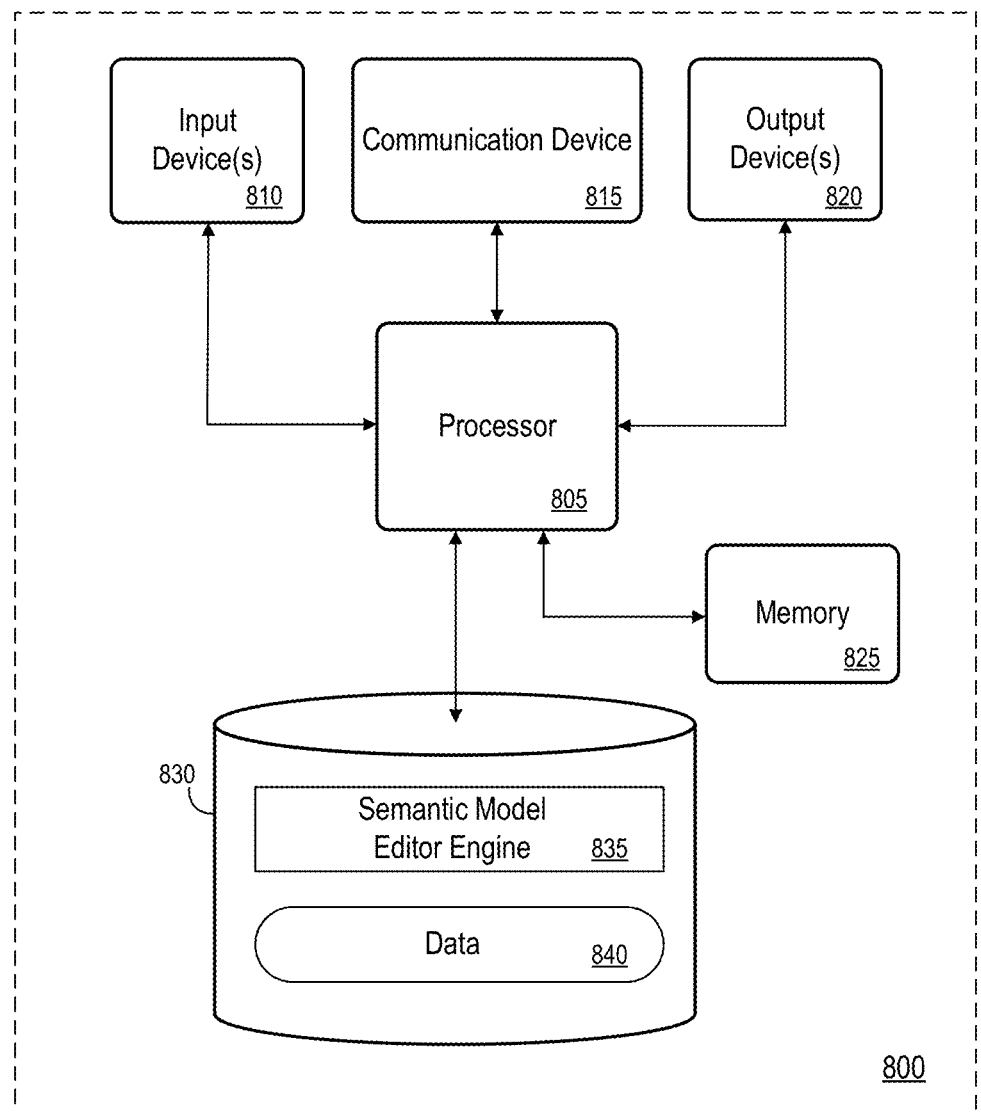
FIG. 8 is an illustrative depiction of a block diagram of a system or device that can support some processes disclosed herein.

FIG. 6 is an illustrative graph of a semantic model 600 based on the model of FIG. 3 with some exemplary instance data for the domain, in accordance with some embodiments. In particular, Joe 605 is a Person 610 with weight (a DATA 615 with value 200, with unit "lbs", with validity true) and age (a DATA 615 with value 23, with unit "yrs", with validity true). As an example, a statement including a property chain may be, "Joe is less than 23". Without any clarification or specification regarding what the missing property is in this statement, it is unclear (i.e., ambiguous) whether "less than 23" refers to the subject Joe's property of age or weight. Since there is more than one possibility for the missing property given semantic model 600, the property cannot be unambiguously determined.

In one embodiment, the ontology of model 600 may be expanded or otherwise modified to include a specification, indicator, or other mechanism that specifies the use of a particular property in the instance of a missing property of a specific type. This mechanism may provide and support disambiguation, in some aspects. In the present example of "Joe is less than 23", model 600 may be modified to include a "missing triple pattern" or missing property specification that specifies using the property age for a value associated with Joe that is less than 105. In this example, since the value "23" is less than 105, then the statement "Joe is less than 23" can be unambiguously interpreted to mean "The age of Joe is less than 23 years". The inclusion of an explicit specification in the ontology regarding the use of the property age provides a mechanism to accurately interpret (i.e., translate) the property chain with the missing triple pattern.

As illustrated by the foregoing example of FIG. 6, a definition regarding the specific use or application of the age property is sufficient to resolve ambiguities related to the age and weight for the subject "Joe". In this example, the specification regarding the use and application of the property age for a specific scenario (i.e., value is less than 105)

is sufficient to fully clarify when to use the property age as opposed to the property weight. That is, an ontology need not include a missing property specification regarding the use and application of each and every property therein (e.g., some properties might not be able to be dropped within the context of an ontology), even for properties that might be omitted from a property chain. So long as the constraints on the use and application of the properties in an ontology that are specified in one or more missing property specifications resolves any ambiguities regarding the properties in the ontology, then the number and scope of the one or more missing property specifications is sufficient. As shown in the example of FIG. 6, referencing the one missing property specification regarding the property age is sufficient to resolve the ambiguity presented by the statement, "Joe is less than 23". A missing property specification explicitly stating terms of use and application regarding the property weight is not needed, in this example.

In some aspects herein, the use of one or more of a model class or instance of a model class might be represented by a function or function return value, where the function can be explicitly specified in the ontology to define the function. For example, a property might be represented by a function or function return value in an ontology graph pattern, as well as a property chain (e.g., a property as an argument or assignment). An expression including a type mismatch may invoke a reference to a corresponding ontology to determine whether the ontology includes a mechanism to clarify the meaning of the expression. As disclosed herein, the type mismatch might include an implied property and a missing property, the meaning of which may be unambiguously determined based on an implied property or expanded property and a missing property specification, respectively, in the ontology.

In one embodiment, the type mismatch might include a reference to a function or function return value, where the function is specified in the ontology. In this manner, a statement or expression need not be limited to a comparison, assignment, or property chains but can be defined as a function specified in the ontology. For example, consider the expression, "Function 23 of Joe(4)". Clearly there is a type mismatch between "Joe" and Function 23". However, if the ontology for the person "Joe" also specifies a definition for Function 23 as "Function 23=a person's age+<integer>", then the expression of "Function 23 of Joe(4)" may be unambiguously interpreted to mean "The age of Joe plus 4 years".

In some embodiments, a function specified or defined in an ontology is not limited to numeric values, strings, or other particular types of data. The function or a return value of a function defined in an ontology in accordance with the present disclosure may be used and applied to resolve, to an unambiguous certainty, the meaning of expressions related to and supported by a semantic model of the ontology.

FIG. 7 is an illustrative depiction of a framework or process 700 for adding a missing property specification feature to a semantic modeling language ontology. In the present disclosure, the missing property specification might be used to translate and/or evaluate natural language expressions including a property chin that omits at least one property therein in the context of a controlled-English semantic model. In some aspects, a system ontology is provided to, obtained by, or otherwise accessible or known by a system or device executing process 700 prior to or during the execution of process 700.

At operation 705, a semantic model is accessed. The semantic model of operation 705 may include a grammar syntax that supports an expression including a combination of at least one of a semantic model class or an instance of a semantic model class. The expression may include a chain of properties. A validator function and/or a translator function of a semantic model processing method or system might yield an error in the instance a type mismatch is determined based on a missing property in the expression, as discussed above.

In accordance with some aspects herein and in an effort to facilitate and support natural language-like expressions, a missing property specification is defined at operation 710. The missing property is specified or otherwise defined as being associated with a specific class or the instance of a class within the domain of the semantic model accessed in operation 705.

Continuing to operation 715, the missing property specification defined at operation 710 is added to the semantic model. The missing property specification may be added to the semantic model via a semantic model editor (e.g., FIG. 1, system 100) or other systems, devices, and processes. The missing property specification added to the semantic model may be referenced in a validation and translation of an expression including one of the class or the instance of a class specified therein in an effort to unambiguously determine a missing property in the expression, as indicated by a type mismatch.

At operation 720, a record of the semantic model, as modified to include the missing property specification added at operation 715, is generated. The record may be implemented in any data structure now known or that becomes known in the future. The record of the semantic model including the missing property specification may be stored in a database and managed thereby for fast and efficient storing, retrieving, and version tracking.

In some embodiments, a semantic model improved or enhanced by the addition of a missing property specification as disclosed herein may be further used in other processes by a system, service, or device. In particular, such a semantic model may be used to express statements in a manner that more closely tracks natural language due, at least in part, to the missing property specification included in the semantic model.

As demonstrated by the foregoing examples, missing property specifications can be added to a modeling language to enhance the modeling capabilities and flexibility of the language, as well as being used in a variety of scenarios to produce more natural statements and expressions.

Apparatus 800 includes processor 805 operatively coupled to communication device 815 to communicate with other systems, data storage device 830, one or more input devices 810 to receive inputs from other systems and entities, one or more output devices 820 and memory 825. Communication device 815 may facilitate communication with other systems and components, such as other devices, a communications network, and a server. Input device(s) 810 may comprise, for example, a keyboard, a keypad, a mouse or other pointing device, a microphone, knob or a switch, an infra-red (IR) port, a docking station, and/or a touch screen. Input device(s) 810 may be used, for example, to enter information into apparatus 800 such as a missing property specification and queries to make use of missing property specifications of a semantic model. Output device(s) 820 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), solid state storages device, optical storage devices, Read Only Memory (ROM) devices, Random Access Memory (RAM), Storage Class Memory (SCM) or any other fast-access memory. Data storage device 830 might store flight data plans, optimized controls command by some embodiments herein, etc.

Semantic model editor engine 835 and data 840 may comprise program instructions executed by processor 805 to cause apparatus 800 to perform any one or more of the processes described herein, including but not limited to aspects disclosed in FIG. 7. Embodiments are not limited to execution of these processes by a single apparatus.

Data 840 (either cached or a full database) may be stored in volatile memory such as memory 825. Data storage device 830 may also store semantic model data and other program code for providing additional functionality and/or which are necessary for operation of apparatus 800, such as device drivers, operating system files, etc. Data 840 may include performance data related software requirement translations that may be used in future software requirement translation tuning and/or optimization purposes.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed includes:

1. A method comprising:
    accessing from a server, via a processor, a semantic model, the semantic model being stored in a storage medium as part of a query-responsive data source stored in a data storage system configured to store structured or unstructured data, the semantic model having a grammar syntax supporting an expression including a combination of at least one of a semantic model class and an instance of a semantic model class, the semantic model defining at least one chain of properties for the expression;
    specifying, using the processor, at least one missing property specification for at least one of a semantic model class and an instance of a semantic model class for the semantic model, the at least one missing property specification defining constraints for a use of at least one missing property with the at least one of a semantic model class and an instance of a semantic model class, wherein the constraints comprise a specified range of values for the at least one missing property;
    adding, by the processor, the at least one missing property specification to the at least one chain of properties for the expression of the semantic model, the at least one missing property specification added to the semantic model to be referenced in a validation and translation of an expression including a combination of at least one of the class and the instance of a class having one of the at least one missing property specified therewith, the at least one missing property specification indicating constraints on use and application of one or more properties of the at least one chain of properties for the expression and the at least one chain of properties including a portion of a specified property chain not including each and every property of the specified property chain;
    generating, by the processor, a record of the semantic model including the at least one missing property specification added thereto;
    storing, by the processor, the record of the semantic model in a data storage device;
    in response to receiving a query comprising a comparison statement, translating, by the processor, the query into a translation query at least in part by resolving one or more ambiguities for the comparison statement based on application of the comparison statement to the at least one chain of properties for the expression; and
    performing, by the processor, a search based on the translation query and the stored record of the semantic model including the at least one missing property specification, and generating a result corresponding to the received query.

2. The method of claim 1, wherein the expression supported by the grammar syntax of the semantic model includes at least one of a chain of properties, a function, a return value of a function, a value for a property, and combinations thereof.

3. The method of claim 2, wherein the expression supported by the grammar syntax of the semantic model includes at least one of a function including at least one of a comparison and an assignment.

4. The method of claim 2, where the value of the property is at least one of a number and a string value.

5. The method of claim 1, further comprising:
    validating the expression to determine whether there is a type mismatch between the at least one of the class and the instance of a class comprising the expression;
    translating the expression to determine whether the expression can be processed in accordance with the grammar of the semantic model; and
    referencing, in an instance the validating and the translating determine there is a type mismatch between the at least one of the class and the instance of a class comprising the expression, the semantic model for the at least one missing property specified for the at least one of the class and the instance of a class included in the expression to use the missing property in the validation and translation of the expression in accordance with the specified constraints for the use of the at least one missing property specification.

6. The method of claim 5, further comprising:
    determining a range of the missing property as defined in the specified constraints for the use of the at least one missing property; and
    evaluating the expression using the determined range of the missing property for the at least one of the class and the instance of a class included in the expression.

7. The method of claim 6, wherein the evaluating of the expression using the determined range of the missing property for the at least one of a class and the instance of a class included in the expression yields in an unambiguous result as defined by the semantic model.

8. The method of claim 1, wherein the modeling language is a Semantic Application Design Language (SADL) Requirements Language (SRL).

9. The method of claim 8, wherein the SRL comprises a constrained SRL.

10. A system comprising:
a memory storing processor-executable instructions; and
a processor to execute the processor-executable instructions to cause the system to:
access a semantic model, via the processor, the semantic model being stored in a storage medium as part of a query-responsive data source stored in a data storage system configured to store structured or unstructured data, the semantic model having a grammar syntax supporting an expression including a combination of at least one of a semantic model class and an instance of a semantic model class, the semantic model defining at least one chain of properties for the expression and;
specify, using the processor, at least one missing property specification for at least one of a semantic model class and an instance of a semantic model class for the semantic model, the at least one missing property specification specifying constraints for a use of at least one missing property with the at least one of a semantic model class and an instance of a semantic model class, wherein the constraints comprise a specified range of values for the at least one missing property;
add, by the processor, the at least one missing property specification to the at least one chain of properties for the expression of the semantic model, the at least one missing property specification added to the semantic model to be referenced in a validation and translation of an expression including a combination of at least one of the class and the instance of a class having one of the at least one missing property specified therewith, the at least one missing property specification indicating constraints on use and application of one or more properties of the at least one chain of properties for the expression and the at least one chain of properties including a portion of a specified property chain not including each and every property of the specified property chain;
generate, by the processor, a record of the semantic model including the at least one missing property specification added thereto;
store, by the processor, the record of the semantic model in a data storage device;
in response to receiving a query comprising a comparison statement, translate, by the processor, the query into a translation query at least in part by resolving one or more ambiguities for the comparison statement based on application of the comparison statement to the at least one chain of properties for the expression; and
perform, by the processor, a search based on the translation query and the stored record of the semantic model including the at least one missing property specification, and generate a result corresponding to the received query.

11. The system of claim 10, wherein the expression supported by the grammar syntax of the semantic model includes at least one of a chain of properties, a function, a return value of a function, a value for a property, and combinations thereof.

12. The system of claim 11, wherein the expression supported by the grammar syntax of the semantic model includes at least one of a function including at least one of a comparison and an assignment.

13. The system of claim 11, where the value of the property is at least one of a number and a string value.

14. The system of claim 10, further comprising:
validating the expression to determine whether there is a type mismatch between the at least one of the class and the instance of a class comprising the expression;
translating the expression to determine whether the expression can be processed in accordance with the grammar of the semantic model; and
referencing, in an instance the validating and the translating determine there is a type mismatch between the at least one of the class and the instance of a class comprising the expression, the semantic model for the at least one missing property specified for the at least one of the class and the instance of a class included in the expression to use the missing property in the validation and translation of the expression in accordance with the specified constraints for the use of the at least one missing property specification.

15. The system of claim 14, further comprising:
determining a range of the missing property as defined in the specified constraints for the use of the at least one missing property specification; and
evaluating the expression using the determined range of the missing property for the at least one of the class and the instance of a class included in the expression.

16. The system of claim 15, wherein the evaluating of the expression using the determined range of the missing property for the at least one of a class and the instance of a class included in the expression yields in an unambiguous result as defined by the semantic model.

17. The system of claim 10, wherein the modeling language is a Semantic Application Design Language (SADL) Requirements Language (SRL).

18. The system of claim 17, wherein the SRL comprises a constrained SRL.

* * * * *